(12) United States Patent
Huang et al.

(10) Patent No.: US 10,173,480 B2
(45) Date of Patent: Jan. 8, 2019

(54) MAGNETICALLY CONTROLLED TIRE PRESSURE MONITORING APPARATUS

(71) Applicants: Tien-Tsai Huang, New Taipei (TW); Teng-Wen Huang, New Taipei (TW)

(72) Inventors: Tien-Tsai Huang, New Taipei (TW); Teng-Wen Huang, New Taipei (TW)

( * ) Notice: Subject to any disclaimer, the term of this patent is extended or adjusted under 35 U.S.C. 154(b) by 0 days.

(21) Appl. No.: 15/709,594

(22) Filed: Sep. 20, 2017

(65) Prior Publication Data

US 2018/0345742 A1    Dec. 6, 2018

(30) Foreign Application Priority Data

Jun. 2, 2017  (TW) .............................. 106118206 A

(51) Int. Cl.
B60C 23/04 (2006.01)

(52) U.S. Cl.
CPC ...... B60C 23/0425 (2013.01); B60C 23/0496 (2013.01)

(58) Field of Classification Search
CPC ............ B60C 23/0425; B60C 23/0496; B60C 23/0408; B60C 23/063
See application file for complete search history.

(56) References Cited

U.S. PATENT DOCUMENTS

| | | | | |
|---|---|---|---|---|
| 3,638,180 A | * | 1/1972 | Lejeune | B60C 23/0425 335/205 |
| 3,715,719 A | * | 2/1973 | Sugiyama | B60C 23/0425 200/61.25 |
| 4,131,877 A | * | 12/1978 | Stewart | B60C 23/0425 200/61.25 |
| 5,285,189 A | * | 2/1994 | Nowicki | A44B 15/005 200/61.22 |
| 5,463,374 A | * | 10/1995 | Mendez | B60C 23/0433 340/442 |
| 5,497,143 A | * | 3/1996 | Matsuo | B62J 6/001 340/432 |
| 5,717,135 A | * | 2/1998 | Fiorletta | B60C 23/009 340/447 |

(Continued)

FOREIGN PATENT DOCUMENTS

| | | |
|---|---|---|
| CN | 103121435 B | 10/2015 |
| TW | 361392 U | 6/1999 |
| TW | 201708001 A | 3/2017 |

*Primary Examiner* — An T Nguyen
(74) *Attorney, Agent, or Firm* — Bacon & Thomas, PLLC

(57) ABSTRACT

A magnetically controlled tire pressure monitoring apparatus includes a tire pressure detector, a power supply and a wake-up device. The power supply supplies electrical power to the tire pressure detector. The tire pressure detector includes a pressure sensor used to detect a tire pressure, a microcontroller connected to the pressure sensor and used to convert the tire pressure to a tire pressure value, a register connected to the microcontroller and used to store the tire pressure value or an ID code of the magnetically controlled tire pressure monitoring apparatus for data processing by the microcontroller, and a wireless signal transmitter connected to the microcontroller and used to convert the tire pressure value or the ID code to an electromagnetic signal. The wake-up device includes a reed switch connected to the microcontroller to control whether the wireless signal transmitter transmits the electromagnetic signal or not.

17 Claims, 14 Drawing Sheets

(56) References Cited

U.S. PATENT DOCUMENTS

| | | | | |
|---|---|---|---|---|
| 5,929,755 | A * | 7/1999 | Hsieh | B60C 23/0408 340/442 |
| 5,963,128 | A * | 10/1999 | McClelland | B60C 23/0433 340/440 |
| 6,175,301 | B1 * | 1/2001 | Piesinger | B60C 23/0433 116/34 R |
| 7,076,999 | B1 * | 7/2006 | Knox | B60C 23/0425 73/146.3 |
| 2002/0130771 | A1 * | 9/2002 | Osborne | B60C 23/005 340/438 |
| 2003/0164758 | A1 * | 9/2003 | King | B60C 23/0416 340/442 |
| 2003/0200051 | A1 | 10/2003 | Nakashima et al. | |
| 2004/0079144 | A1 * | 4/2004 | Newman | B60C 23/0408 73/146 |
| 2006/0220805 | A1 * | 10/2006 | Thomas | B60C 23/0416 340/426.33 |
| 2006/0220815 | A1 * | 10/2006 | Thomas | B60C 23/0416 340/447 |
| 2007/0125161 | A1 * | 6/2007 | Bryzek | B60C 23/0408 73/146.4 |
| 2007/0279203 | A1 * | 12/2007 | Thomas | B60C 23/068 340/447 |
| 2008/0100430 | A1 * | 5/2008 | Kochie | B60C 23/0408 340/447 |
| 2009/0021362 | A1 * | 1/2009 | Kochie | B60C 23/0408 340/442 |
| 2010/0066521 | A1 * | 3/2010 | Yoshida | B60C 23/0401 340/438 |
| 2010/0256946 | A1 * | 10/2010 | Carresjo | B60C 23/0462 702/138 |
| 2013/0154553 | A1 * | 6/2013 | Steele | B60L 11/182 320/108 |
| 2014/0096881 | A1 * | 4/2014 | Loewe | B60C 23/12 152/415 |
| 2014/0309844 | A1 * | 10/2014 | Breed | B60R 21/0132 701/31.5 |
| 2016/0343178 | A1 * | 11/2016 | Lesesky | B60C 19/00 |

* cited by examiner

MAGNETICALLY CONTROLLED TIRE PRESSURE MONITORING APPARATUS

BACKGROUND

1. Field of the Invention

The present invention relates to a tire pressure monitoring apparatus and, more particularly, to a magnetically controlled tire pressure monitoring apparatus.

2. Description of Related Art

Generally, it is necessary to maintain sufficient tire pressure for a tire to ensure the driving safety. A tire pressure monitoring apparatus is used to detect the tire pressure and send out a warning when the tire pressure is insufficient.

Tire pressure monitoring apparatuses can be classified into external tire pressure monitoring apparatuses and internal tire pressure monitoring apparatuses. An external tire pressure monitoring apparatus is set on a valve out of a tire, and can be installed or removed at any time. An internal tire pressure monitoring apparatus is set in the tire and thus hard to be lost, and the tire can have a clean appearance. Generally; the tire pressure monitoring apparatus outputs data wirelessly.

Conventionally, a wireless tire pressure monitoring apparatus is configured to transmit electromagnetic signals periodically to output data. It transmits signals once in one time interval. However, the prior art wireless tire pressure monitoring apparatus is not convenient, since the car driver or user may want to know the tire pressure value earlier; or, during parking time, it is unnecessary to know the tire pressure value, and the wireless tire pressure monitoring apparatus does not have to transmit signals either. Therefore, the prior art wireless tire pressure monitoring apparatus still needs to be improved.

SUMMARY

In light of the above, according to a first aspect of the present invention, there is provided a magnetically controlled tire pressure monitoring apparatus, which includes a tire pressure detector, a power supply and a wake-up device. The power supply supplies electrical power to the tire pressure detector. The tire pressure detector includes a pressure sensor used to detect a tire pressure; a microcontroller connected to the pressure sensor and used to convert the detected tire pressure to a tire pressure value; a register connected to the microcontroller and used to store the tire pressure value or an ID code of the magnetically controlled tire pressure monitoring apparatus for data processing by the microcontroller; and a wireless signal transmitter connected to the microcontroller and used to convert the tire pressure value to an electromagnetic signal. The wake-up device includes a reed switch connected to the microcontroller to control whether the wireless signal transmitter transmits the electromagnetic signal or not.

Accordingly, a bidirectional communication can be achieved between a car driver or user and the magnetically controlled tire pressure monitoring apparatus. The car driver or user can use the magnetic controller to actively emit a magnetic field to activate (or wake up) the magnetically controlled tire pressure monitoring apparatus, and the magnetically controlled tire pressure monitoring apparatus can further transmit data signals to the car driver or user. Compared to the prior art which can only passively wait for periodically transmitting data signals, the present invention has much more flexibility.

In addition, the magnetically controlled tire pressure monitoring apparatus of the present invention is activated only when a magnetic field approaches it, and it can be configured to transmit data signals only at a specified time instead of all times, thereby realizing the purpose of power saving.

It is noted that, the use of a reed switch in the present invention is advantageous, since the reed switch is controlled by a magnetic field, and the magnetic field can be provided by a permanent magnet, which does not consume any electrical power. A magnetic controller made of a permanent magnet to control the magnetically controlled tire pressure monitoring apparatus of the present invention can also realize the purpose of power saving.

According to a second aspect of the present invention, there is provided a magnetically controlled tire pressure monitoring apparatus module, which includes a plurality of the magnetically controlled tire pressure monitoring apparatuses, a magnetic controller and a wireless signal receiver. The magnetically controlled tire pressure monitoring apparatuses are suitable to be arranged on a plurality of tires, respectively. The magnetically controlled tire pressure monitoring apparatus of the present invention can be used in a pneumatic tire of a motorcycle, automobile, bus, truck, lorry or trailer, or airplanes. The magnetic controller can emit a magnetic field to activate the magnetically controlled tire pressure monitoring apparatuses. The wireless signal receiver can receive the electromagnetic signals transmitted from the magnetically controlled tire pressure monitoring apparatuses.

In general, the magnetically controlled tire pressure monitoring apparatuses are installed on a plurality of tires of a car, respectively. Taking a truck as an example, there are plural tires on a hind axle of the truck, and it is difficult to detect the tire pressure of the inner tire. Therefore, a car driver or user may require that they can receive all tire pressure values detected by the magnetically controlled tire pressure monitoring apparatuses at one time when the car enters a test station. The magnetically controlled tire pressure monitoring apparatus module of the present invention is advantageous for such requirement, since a magnetic controller made of a permanent magnet can induce a stable and extensive magnetic field to activate the magnetically controlled tire pressure monitoring apparatuses.

According to a third aspect of the present invention, there is provided a magnetically controlled tire pressure monitoring apparatus, which includes a tire pressure detector, a power supply, an LED lamp and a wake-up device. The power supply supplies electrical power to the tire pressure detector. The tire pressure detector includes a pressure sensor used to detect a tire pressure; and a microcontroller connected to the pressure sensor and used to convert the tire pressure to tire pressure value data. The LED lamp is connected to the microcontroller of the tire pressure detector and used to display a warning light according to a current state indicated by the tire pressure value data. The wake-up device includes a reed switch connected to the microcontroller to controller to control whether to light up the LED lamp or not.

According to a fourth aspect of the present invention, there is provided a magnetically controlled tire pressure monitoring apparatus, which includes a tire pressure detector, a power supply, a display device and a wake-up device. The power supply supplies electrical power to the tire pressure detector. The tire pressure detector includes a pressure sensor used to sense a tire pressure; and a microcontroller connected to the pressure sensor and used to convert the tire pressure to a tire pressure value, The display device is connected to the microcontroller of the tire pressure detector and used to display the tire pressure value. The wake-up device includes a reed switch connected to the microcontroller to control whether to light up the display device or not.

The LED lamp and the display device can be referred to as a monitor.

In conclusion, the magnetically controlled tire pressure monitoring apparatus and the magnetically controlled tire pressure monitoring apparatus module by the present invention are activated according to a magnetic field, especially a magnetic field emitted from an external magnetic controller which is not a part of the magnetically controlled tire pressure monitoring apparatus. The magnetically controlled tire pressure monitoring apparatus and the magnetically controlled tire pressure monitoring apparatus module of the present invention are applicable to such as motorcycle, automobile, bus, truck, lorry or trailer. A car driver or user can wake up the magnetically controlled tire pressure monitoring apparatus in a specified time when they want, thereby realizing the purpose of power saving. Of course, the magnetically controlled tire pressure monitoring apparatus and the magnetically controlled tire pressure monitoring apparatus module of the present invention are also applicable to tires of airplanes.

DETAILED DESCRIPTION OF THE EMBODIMENT

Different embodiments of the present invention are explained hereinafter. It is to be understood that these embodiments are not meant to limiting. The technical features of the present invention are applicable to other embodiments by modification, replacement, combination, separation and configuration.

Figure 1:
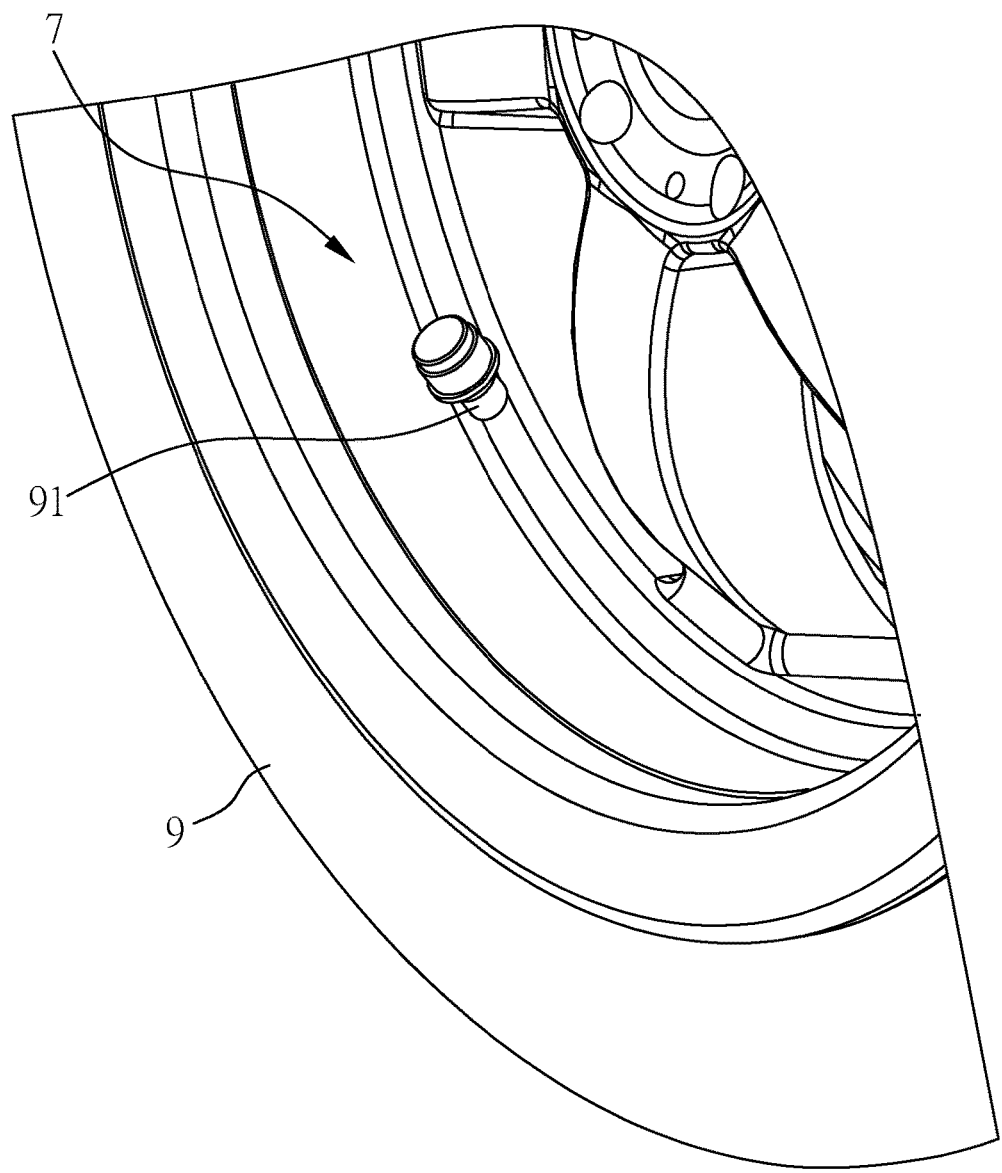
FIG. 1 shows an example of an external tire pressure monitoring apparatus of the present invention.

FIG. 1 shows an example of an external tire pressure monitoring apparatus 7 of the present invention. It is installed on an external side of a tire 9 and threadedly fastened on a valve 91.

Figure 2:
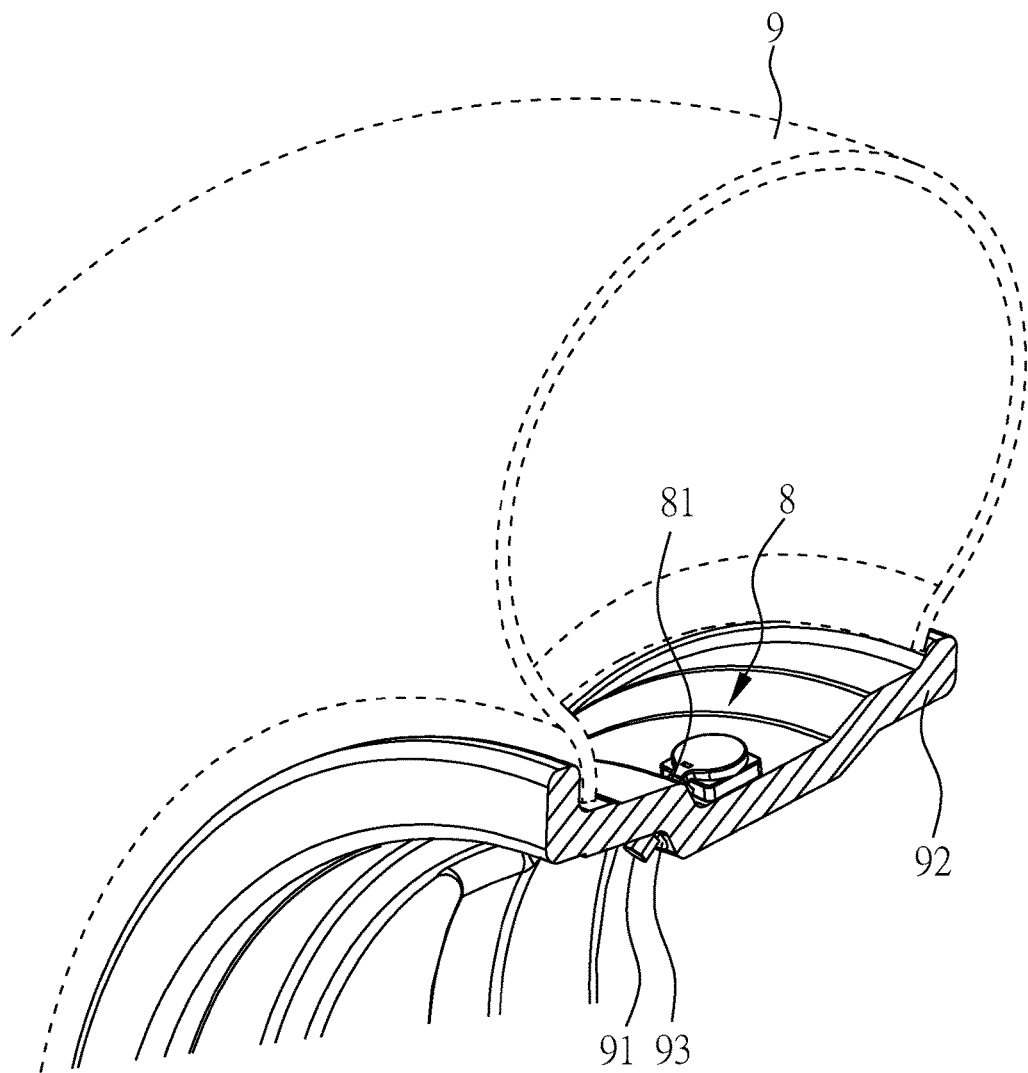
FIG. 2 shows an example of an internal tire pressure monitoring apparatus of the present invention.

FIG. 2 shows an example of an internal tire pressure monitoring apparatus 8 of the present invention. It is installed on a wheel rim 92 of a tire 9, while its body is in an internal side of the tire 9. There is a via-hole structure 81 extending from a valve hole 93 on the wheel rim 92 of the tire 9 to an external side of the tire 9 for connection to a valve 91.

The magnetically controlled tire pressure monitoring apparatus according to the embodiments of the present invention is applicable to either an external tire pressure monitoring apparatus 7 or an internal tire pressure monitoring apparatus 8.

First Embodiment

Figure 3:
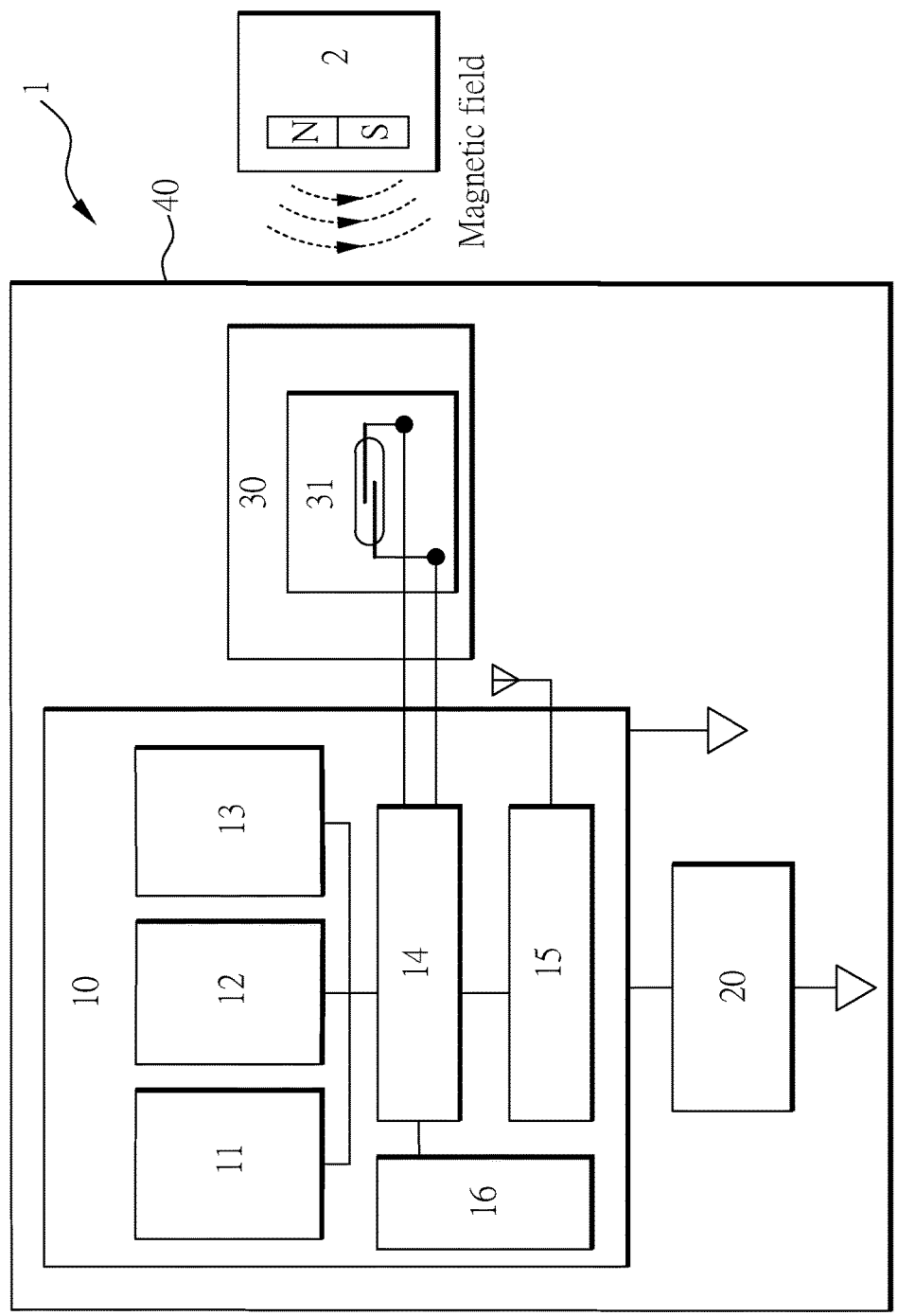
FIG. 3 shows a block diagram of a magnetically controlled tire pressure monitoring apparatus according to a first embodiment of the present invention.

FIG. 3 shows a block diagram of the magnetically controlled tire pressure monitoring apparatus 1 according to the first embodiment of the present invention.

The magnetically controlled tire pressure monitoring apparatus 1 mainly includes a tire pressure detector 10, a power supply 20 and a wake-up device 30, which are all formed on a printed circuit board 40.

The tire pressure detector 10 at least includes a pressure sensor 11, a microcontroller 14, a wireless signal transmitter 15 and a register 16. Furthermore, the tire pressure detector 10 can include a temperature sensor 12 and a voltage sensor 13. The aforementioned components can be integrated into a microprocessor.

The pressure sensor 11 is used to detect a tire pressure. The temperature sensor 12 is used to detect a tire temperature. The voltage sensor 13 is used to detect a voltage of the power supply 20. The pressure sensor 11, the temperature sensor 12 and the voltage sensor 13 are connected to the microcontroller 14. The microcontroller 14 can convert the tire pressure, the tire temperature or the voltage into a tire pressure value, a tire temperature value or a voltage value, respectively, and it also determines whether the wireless signal transmitter 15 transmits an electromagnetic signal or not. The wireless signal transmitter 15 is connected to the microcontroller 14, and is used to convert the tire pressure value, the tire temperature value, the voltage value or an ID code of the magnetically controlled tire pressure monitoring apparatus 1 into an electromagnetic signal. The register 16 is used to store the tire pressure value, the tire temperature value, the voltage value or the ID code of the magnetically controlled tire pressure monitoring apparatus 1 for data processing by the microcontroller 14.

The power supply 20 is used to provide electrical power to the tire pressure detector 10. The power supplier 20 is a battery, for example. The voltage sensor 13 can be used to check the voltage of the battery.

Figure 4:
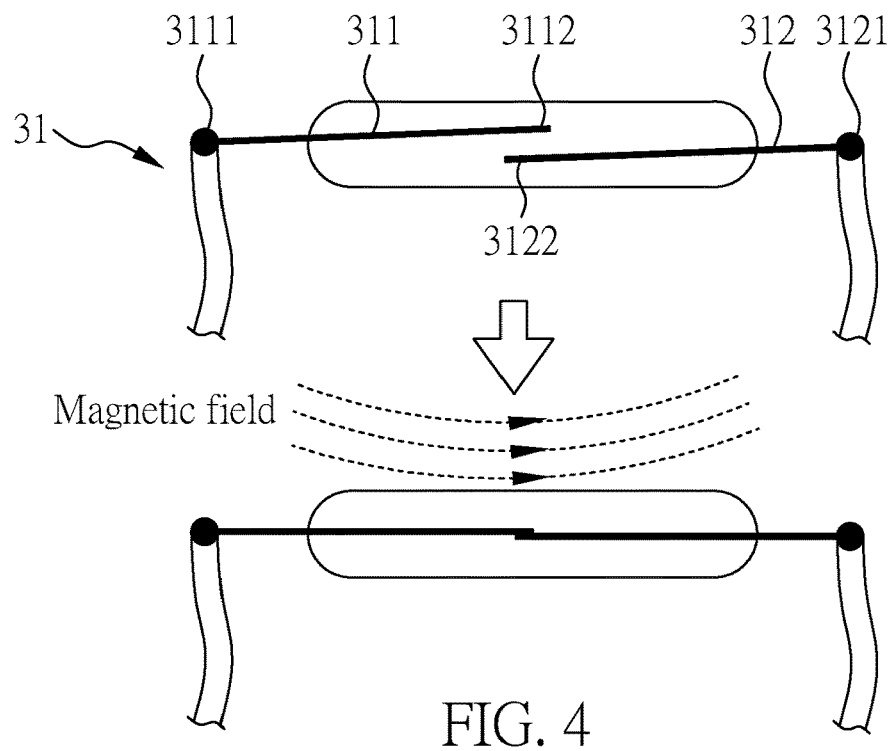
FIG. 4 shows a normally-open reed switch of the present invention.
Figure 5:
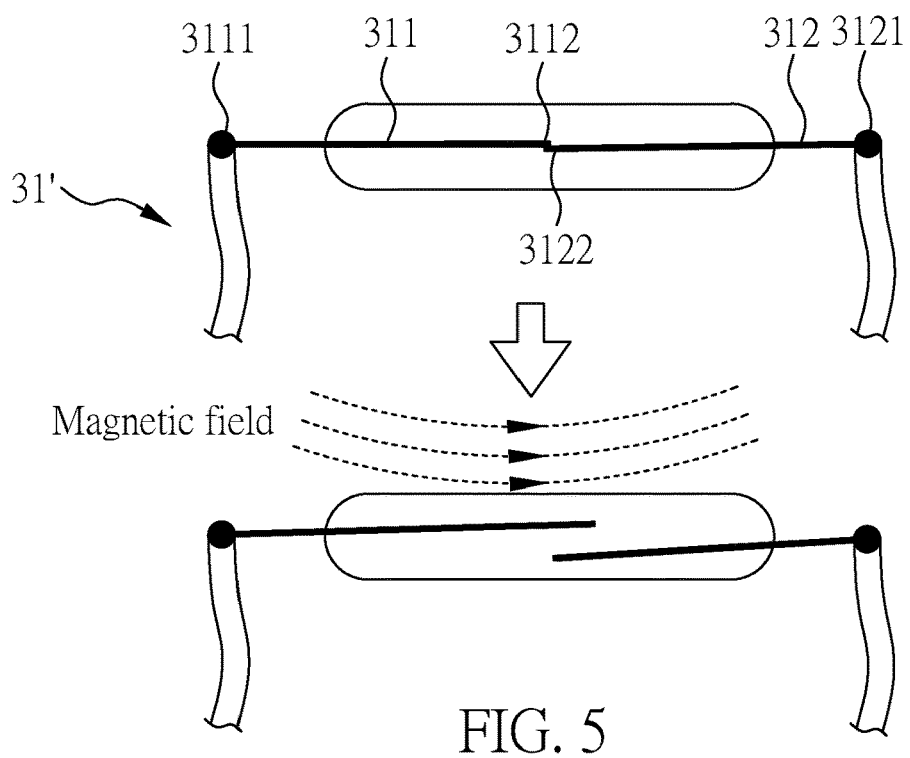
FIG. 5 shows a normally-closed reed switch of the present invention.

The wake-up device 30 includes a reed switch 31. The reed switch 31 is connected to the microcontroller 14, such that the microcontroller 14 controls whether the wireless signal transmitter 15 transmits the electromagnetic signal or not. In particular, the microcontroller 14 determines whether the wireless signal transmitter 15 transmits the electromagnetic signal according to an on/off state of the reed switch 31. The on/off state of the reed switch 31 is controlled by a magnetic field, wherein the state "on" means closed and conducting, and the state "off" means open and non-conducting. As shown in FIGS. 4 and 5, the reed switch 31 can be a normally-open reed switch 31 or a normally-closed reed switch 31'. The reed switch 31 can be a dry reed tube or a magnetically controlled component having two magnetically controllable ends to perform an open circuit or a closed circuit.

FIG. 4 shows the normally-open reed switch 31 of the present invention.

FIG. 5 shows the normally-closed reed switch 31' of the present invention.

Either of the reed switches 31 and 31' includes a first metal spring strip 311 and a second metal spring strip 312. The first metal spring strip 311 has a fixed end 3111 and a free end 3112, and the second metal spring strip 312 has a fixed end 3121 and a free end 3122. The :fixed end 3111 of the first metal spring strip 311 and the fixed end 3121 of the second metal spring strip 312 serve as two ends of the wake-up device 30.

As shown in FIG. 4, for the normally-open reed switch 31, the first metal spring strip 311 and the second metal spring strip 312 are separated from each other, and thus they form an open circuit in a normal state. The existence of a magnetic field will shift the free end 3112 of the first metal spring strip 311 to contact the free end 3122 of the second metal spring strip 312 to form a closed circuit. At this moment, current can flow through the reed switch 31, and voltage can be transmitted from one end of the reed switch 31 to another end of the reed switch 31.

As shown in FIG. 5, for the normally-closed reed switch 31', the first metal spring strip 311 contacts the second metal spring strip 312, and thus they form a closed circuit in a normal state. The existence of a magnetic field will shift the free end 3112 of first metal spring strip 311 to leave the free end 3122 of the second metal spring strip 312 to form an open circuit. At this moment, current cannot flow through the reed switch 31', and voltage cannot be transmitted from one end of the reed switch 31' to another end of the reed switch 31'.

Optionally, the wake-up device 30 can be configured to independently control one of, or a plurality of the pressure sensor 11, the temperature sensor 12, the voltage sensor 13, the microcontroller 14, the wireless signal transmitter 15 and the register 16 in the tire pressure detector 10, such that some of them are in a waking state, while some are in a sleep state.

Optionally, the wake-up device 30 or the microcontroller 14 may include a finite-state machine. The finite-state machine counts how many times the reed switch 31 turns on/off to determine a next on/off state. For example, when the reed switch 31 has been closed for an odd number of times, it controls the wireless signal transmitter 15 or any other components to enter a sleep state. When the reed switch 31 has been closed for an even number of times, it controls the wireless signal transmitter 15 or any other component to enter a waking state. The wake-up device 30 can turn on and off reciprocally (alternatively) according to how many times a magnetic field appears to control each component to enter the sleep state or the waking state.

Optionally, the wake-up device 30 or the microcontroller 14 counts the time interval when the reed switch 31 is closed to determine the next on/off state.

The wake-up device 30 can also have other functions, such as an updated learning function or an inspection function. With the updated learning function, the wake-up device 30 analyses the time points when the magnetically controlled tire pressure monitoring apparatus 1 turns on, and activates it automatically according to the analysis result, or the wake-up device 30 can update the ID code of the magnetically controlled tire pressure monitoring apparatus 1. With the inspection function, the wake-up device 30 checks the function of the magnetically controlled tire pressure monitoring apparatus 1 to determine whether there is a malfunction or not.

Referring back to FIG. 3, since the magnetic force is a non-contact force, the magnetic field that controls the reed switch 31 can be emitted from the magnetic controller 2. The magnetic controller 2 is not a part of the magnetically controlled tire pressure monitoring apparatus 1, and they are independent from each other. When the magnetic controller 2 approaches the magnetically controlled tire pressure monitoring apparatus 1, the magnetic field emitted from it will act on the reed switch 31 to control its on/off state. The magnetic controller 2 may be a portable device to activate the magnetically controlled tire pressure monitoring apparatus 1, and is provided for a car driver or user to hold it to approach the magnetically controlled tire pressure monitoring apparatus 1. It may otherwise be a non-portable device to activate the magnetically controlled tire pressure monitoring apparatus 1 when the car with the magnetically controlled tire pressure monitoring apparatus 1 approaches it.

Accordingly, a bidirectional communication can be achieved between a car driver or user and the magnetically controlled tire pressure monitoring apparatus 1. The car driver or user can use the magnetic controller 2 to actively emit a magnetic field to activate (or wake up) the magnetically controlled tire pressure monitoring apparatus 1, and the magnetically controlled tire pressure monitoring apparatus 1 can further transmit data signals such as the tire pressure value, the tire temperature value, the voltage value or the ID code to the car driver or user. Compared to the prior art which can only passively wait for periodically transmitted data signals, the present invention has much more flexibility.

In addition, the magnetically controlled tire pressure monitoring apparatus 1 of the present invention is activated only when a magnetic field approaches it, such that it can be configured to transmit data signals only at a specified time instead of all times, thereby realizing the purpose of power saving. For example, during the time interval between a car user goes back to a parking space today and the car user goes to work tomorrow, the car user can use the magnetic controller 2 to turn the wireless signal transmitter 15 of the wireless tire pressure monitoring apparatus 1 into the sleep state. On the other hand, when the car is about to set out, the car user can use the magnetic controller 2 to turn the wireless signal transmitter 15 of the wireless tire pressure monitoring apparatus 1 into the waking state.

It is noted that, the use of a reed switch in the present invention is advantageous, since the reed switch is controlled by a magnetic field, and the magnetic field can be provided by a permanent magnet, which does not consume any electrical power. A magnetic controller 2 made of a permanent magnet can control the magnetically controlled tire pressure monitoring apparatus 1 of the present invention by a magnetic field. There is no need to emit electromagnetic waves, such as radio, microwave and infrared, which consume electrical power, and thus it can realize the purpose of power saving. Of course, it is also possible to provide a magnetic field by an electromagnet.

Second Embodiment

Figure 6:
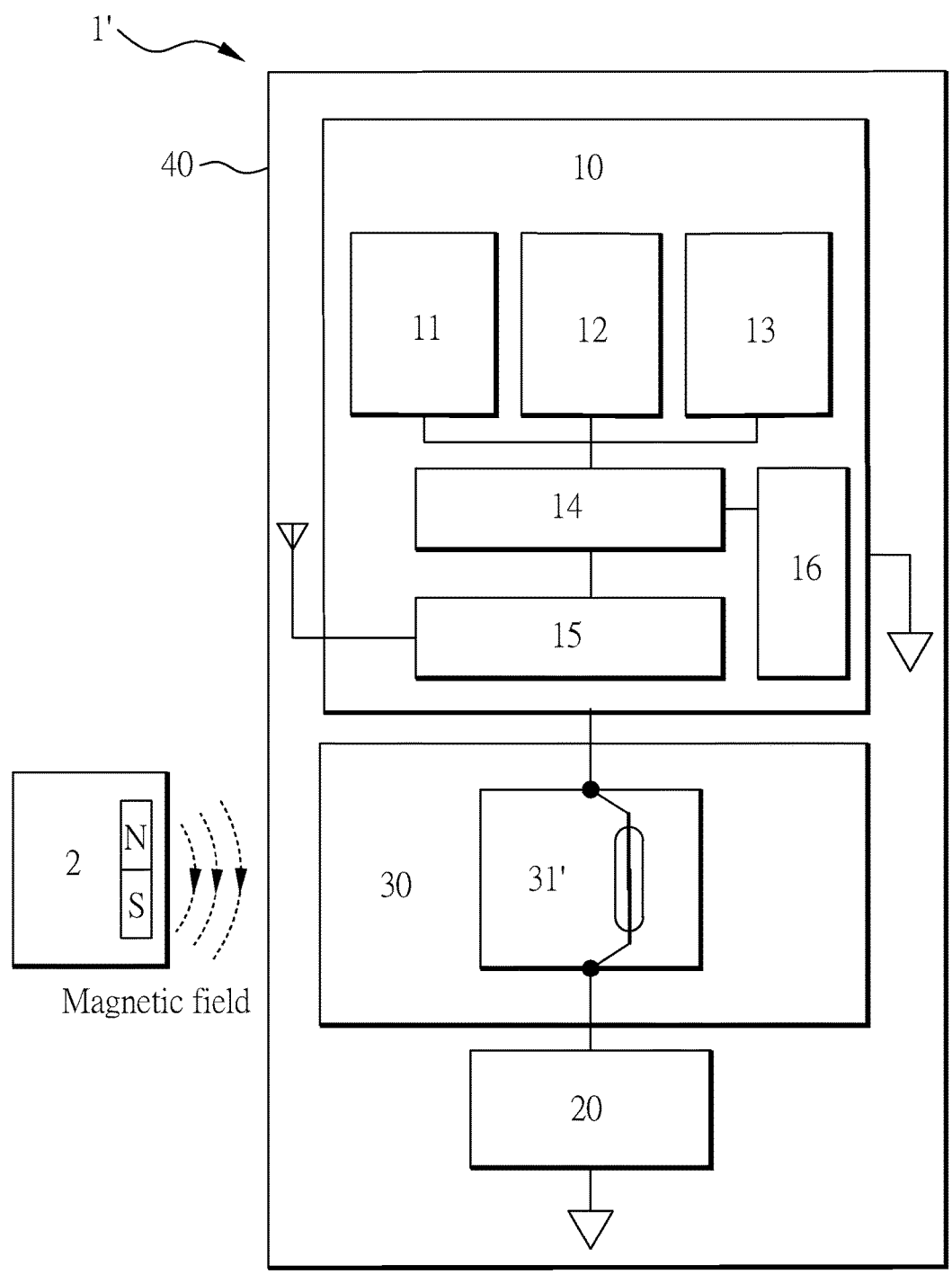
FIG. 6 shows a block diagram of a magnetically controlled tire pressure monitoring apparatus according to a second embodiment of the present invention.

FIG. 6 shows a magnetically controlled tire pressure monitoring apparatus 1' according to the second embodiment of the present invention.

The second embodiment is a variation based on the first embodiment. In the second embodiment, the tire pressure detector 10 and the wake-up device 30 are in a series connection, and the series connection is then connected to the power supply 20. Therefore, the power supply to the tire pressure detector 10 is completely controlled by the wake-up device 30. In addition, the reed switch in the second embodiment is a normally-closed reed switch 31', which is closed in a normal state. Before leaving a garage, the car installed with the magnetically controlled tire pressure monitoring apparatus 1' can be accompanied with the magnetic controller 2, such that the reed switch 31' is open, and thus the magnetically controlled tire pressure monitoring apparatus 1' is stayed in the sleep state. When preparing for the car to leave the garage, the car user may remove the magnetic controller 2, so that, after the car leaves the garage, the reed switch 31' is closed as its normal state, and thus the magnetically controlled tire pressure monitoring apparatus 1' enters the waking state. Other components and their operation are similar to those of the first embodiment.

Third Embodiment

FIGS. 7 to 10 show a magnetically controlled tire pressure monitoring apparatus module 100 according to the third embodiment of the present invention.

Figure 7:
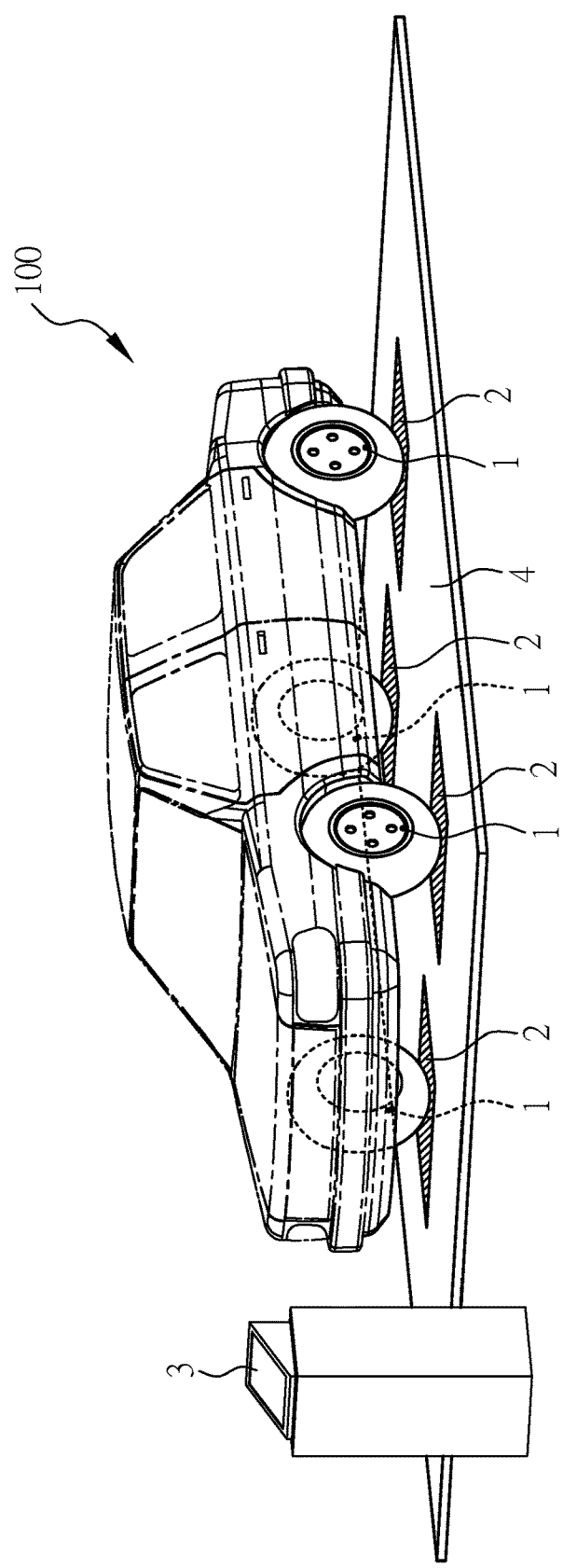
FIGS. 7 to 10 show a magnetically controlled tire pressure monitoring apparatus module according to a third embodiment of the present invention.
Figure 8:
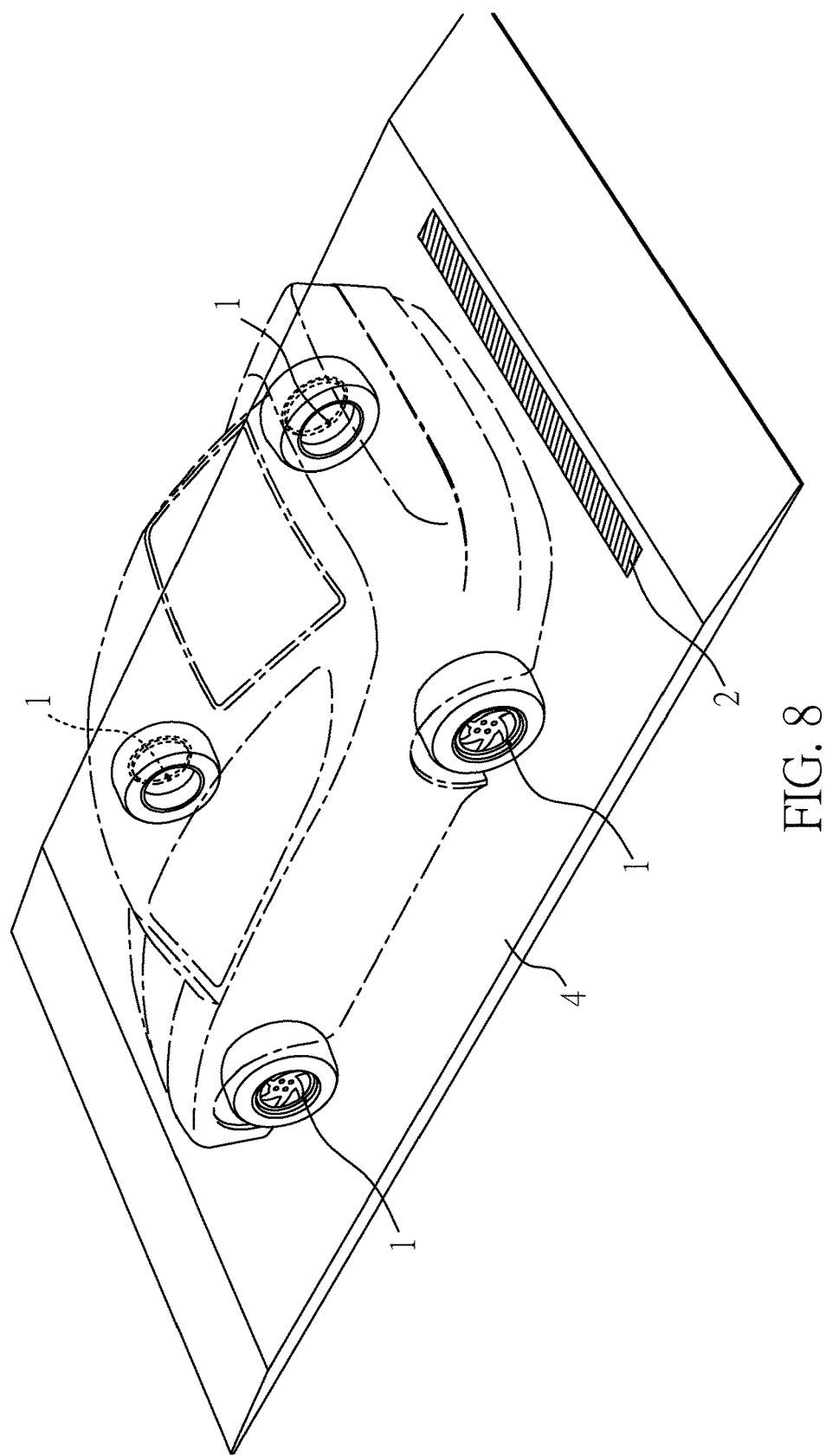
Figure 9:
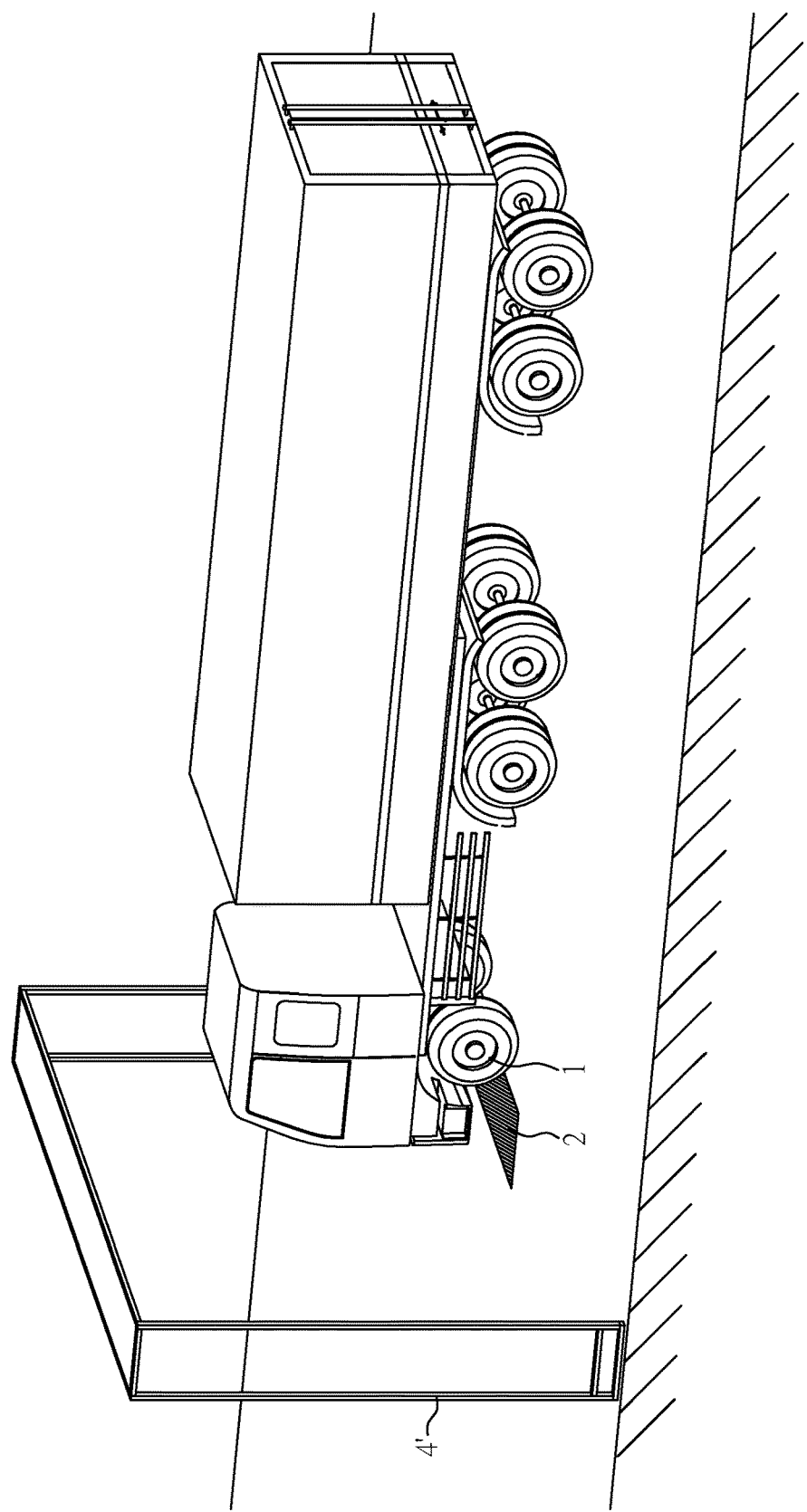
Figure 10:
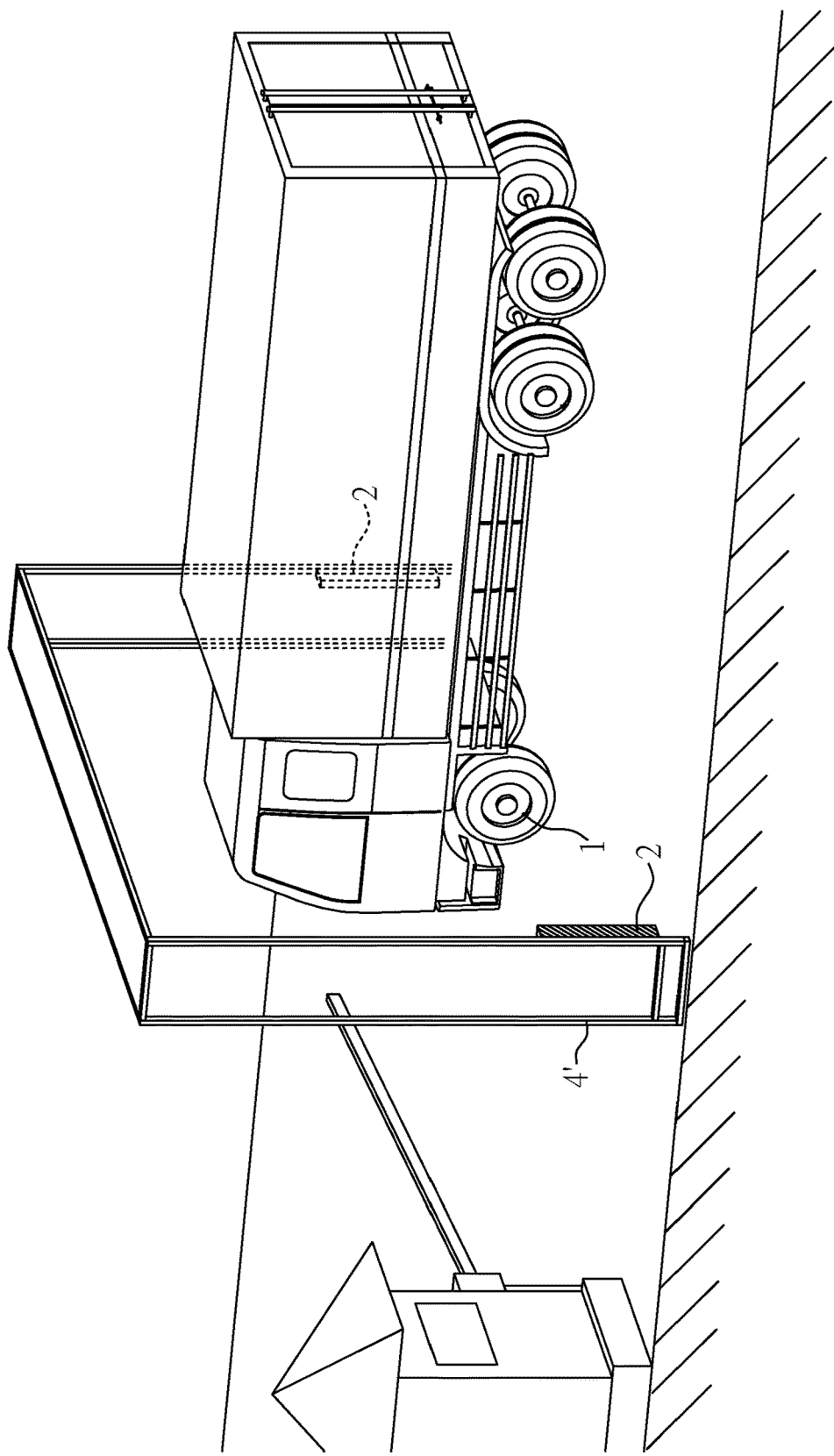

As shown in FIG. 7, the magnetically controlled tire pressure monitoring apparatus module 100 at least includes a plurality of magnetically controlled tire pressure monitoring apparatuses 1, a magnetic controller 2 and a wireless signal receiver 3. The magnetically controlled tire pressure monitoring apparatuses 1 are suitable to be installed on a plurality of tires, respectively, and can be made as discussed in the first embodiment or the second embodiment. The magnetic controller 2 can emit a magnetic field to activate a plurality of magnetically controlled tire pressure monitoring apparatuses 1. The wireless signal receiver 3 can receive a plurality of electromagnetic signals emitted from a plurality of magnetically controlled tire pressure monitoring apparatuses 1 for a computer to read and confirm the tire pressures of the tires.

A car may enter a test station to detect a tire pressure. The test station can include a monitoring center to monitor the driving safety of a fleet of cars by, for example, Internet of Vehicle (IoV). In general, a plurality of magnetically controlled tire pressure monitoring apparatuses 1 are installed on a plurality of tires of a car. A car driver or user may require that they can receive all tire pressure values detected by the magnetically controlled tire pressure monitoring apparatuses 1 at one time when the car enters the test station. The magnetically controlled tire pressure monitoring apparatus module 100 of the present invention is advantageous for such requirement, since a magnetic controller 2 made of a permanent magnet can induce a stable and extensive magnetic field to activate the magnetically controlled tire pressure monitoring apparatuses 1.

As shown in FIGS. 7 to 10, one or more magnetic controllers 2 can be installed on a platform 4 of the test station. The platform 4 is suitable for a motorcycle, an automobile, a bus, a truck, a lorry or a trailer to stop at. Alternatively, the magnetic controllers 2 can be installed on a frame 4' of the test station. The frame 4' is suitable to the aforementioned vehicles to pass through. When the vehicle is stopping on the platform 4, or passing through the frame 4', the magnetic field emitted from the magnetic controller 2 is strong enough to activate the magnetically controlled tire pressure monitoring apparatuses 1 for detection.

The magnetically controlled tire pressure monitoring apparatus module 100 of the present invention is advantageous for a fleet of motorcycles, automobiles, buses, trucks, lorries or trailers to detect their tire pressures in turn. When the fleet is about to set out, the vehicles of the fleet can stop at or pass through the test station one by one for the magnetically controlled tire pressure monitoring apparatus module 100 to detect their tire pressure. This improves the driving safety.

Of course, it is also possible to provide a magnetically controlled tire pressure monitoring apparatus module with one magnetically controlled tire pressure monitoring apparatus 1, one magnetic controller 2 and one wireless signal receiver 3.

In conclusion, the magnetically controlled tire pressure monitoring apparatus and the magnetically controlled tire pressure monitoring apparatus module provided by the present invention are activated according to a magnetic field, especially a magnetic field emitted from an external magnetic controller which is not a part of the magnetically controlled tire pressure monitoring apparatus. The car driver or user can wake up the magnetically controlled tire pressure monitoring apparatus 1 at a specified time when they want, thereby realizing the purpose of power saving.

Fourth Embodiment

Figure 11:
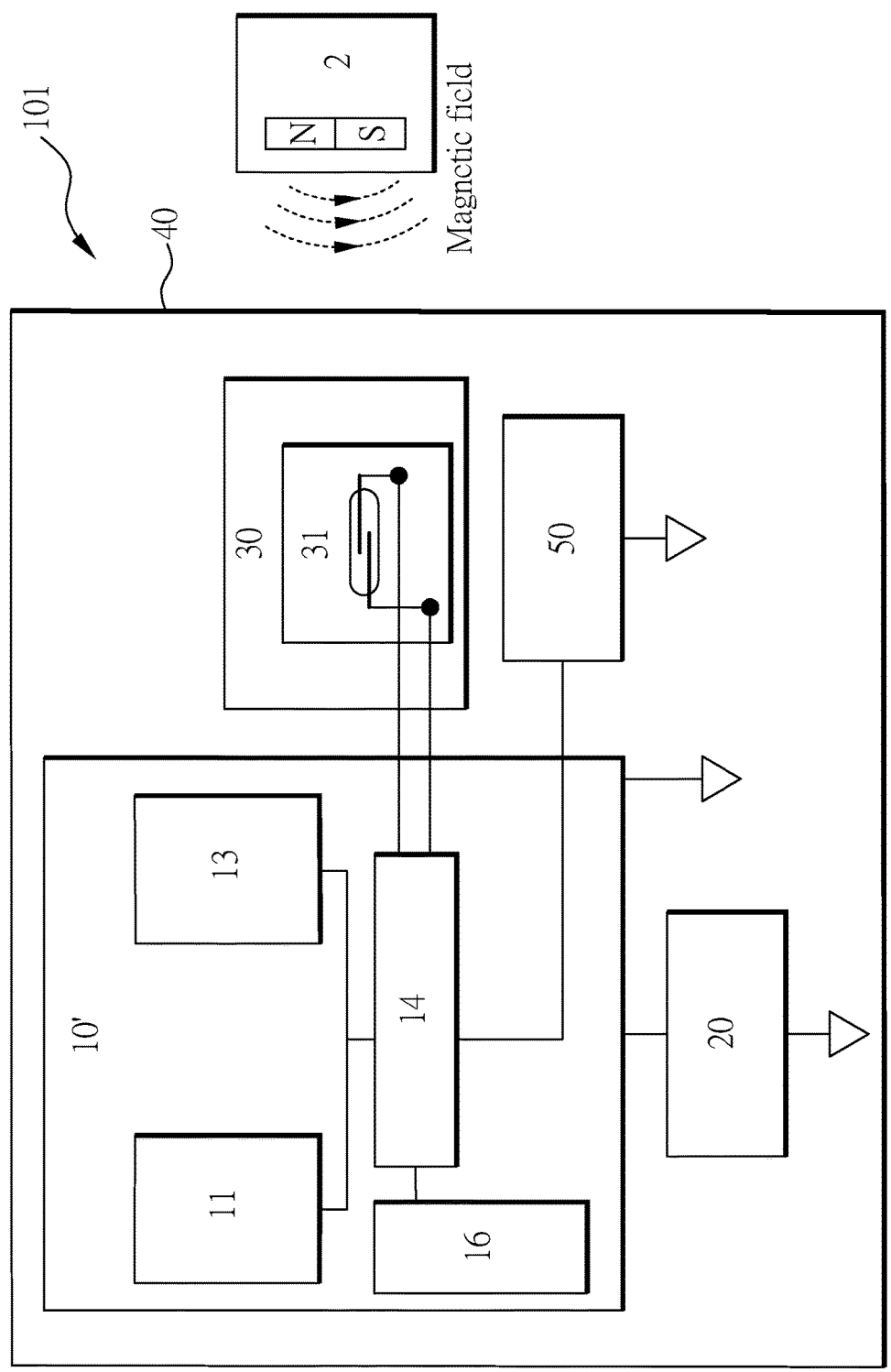
FIG. 11 shows a block diagram of the magnetically controlled tire pressure monitoring apparatus according to a fourth embodiment of the present invention.

FIG. 11 shows a block diagram of the magnetically controlled tire pressure monitoring apparatus 101 according to the fourth embodiment of the present invention.

Figure 12:
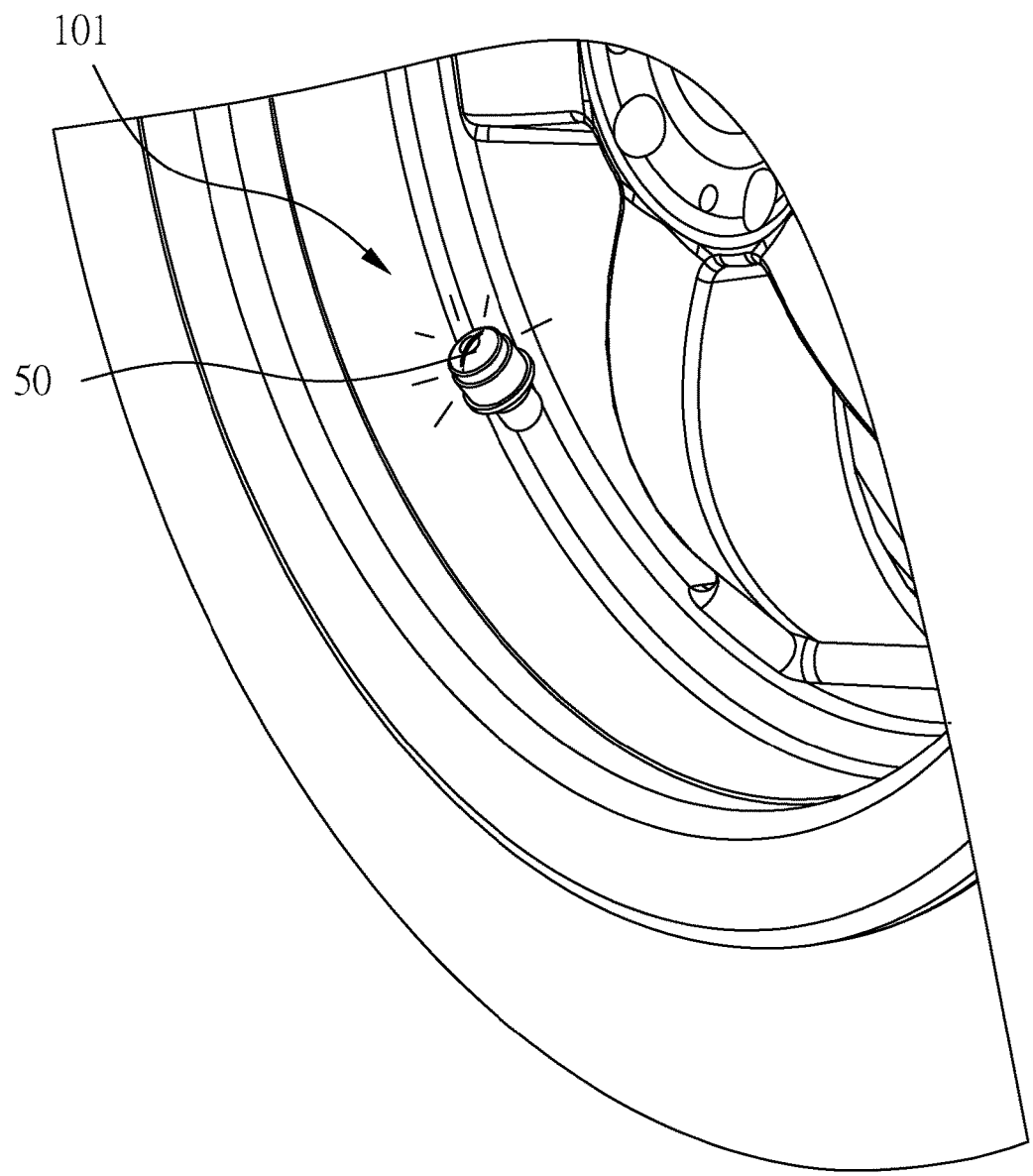
FIG. 12 shows a schematic view of the magnetically controlled tire pressure monitoring apparatus installed on a tire valve according to the fourth embodiment of the present invention.

FIG. 12 shows a schematic view of the magnetically controlled tire pressure monitoring apparatus 101 installed on the tire valve according to the fourth embodiment of the present invention.

The magnetically controlled tire pressure monitoring apparatus 101 mainly includes a tire pressure detector 10', a power supply 20 and a wake-up device 30, which are all formed on a printed circuit board 40. In addition, the magnetically controlled tire pressure monitoring apparatus 101 further includes a light emitting diode (LED) lamp 50.

The tire pressure detector 10' at least includes a pressure sensor 11 and a microcontroller 14. Moreover, it can include a voltage sensor 13. Furthermore, it can include a register 16. The aforementioned components can be integrated into a microprocessor. It is noted that, the tire pressure detector 10' in this embodiment does not include a temperature sensor 12 and a wireless signal transmitter 15.

The LED lamp 50 is connected to the microcontroller 14 of the tire pressure detector 10', and shows warning light according to a tire pressure value. The LED lamp 50 includes lamps of various colors, for example, a red lamp to represent an insufficient tire pressure and a green lamp to represent a normal tire pressure, while lamps of other colors can be used to represent various states of the tire pressure.

The reed switch 31 of the wake-up device 30 is connected to the microcontroller 14, such that the microcontroller 14 determines whether or not to light up the LED lamp 50 according to the on/off state of the reed switch 31, and the on/off state of the reed switch 31 depends on whether the external magnetic field exists or not.

The functions of the other components with the same numeral symbols as the first embodiment can be referred to those described in the first embodiment.

Therefore, the magnetically controlled tire pressure monitoring apparatus 101 of the present invention is lighted up only when a magnetic field approaches it, and remains dark at other times, thereby realizing the purpose of power saving.

Fifth Embodiment

Figure 13:
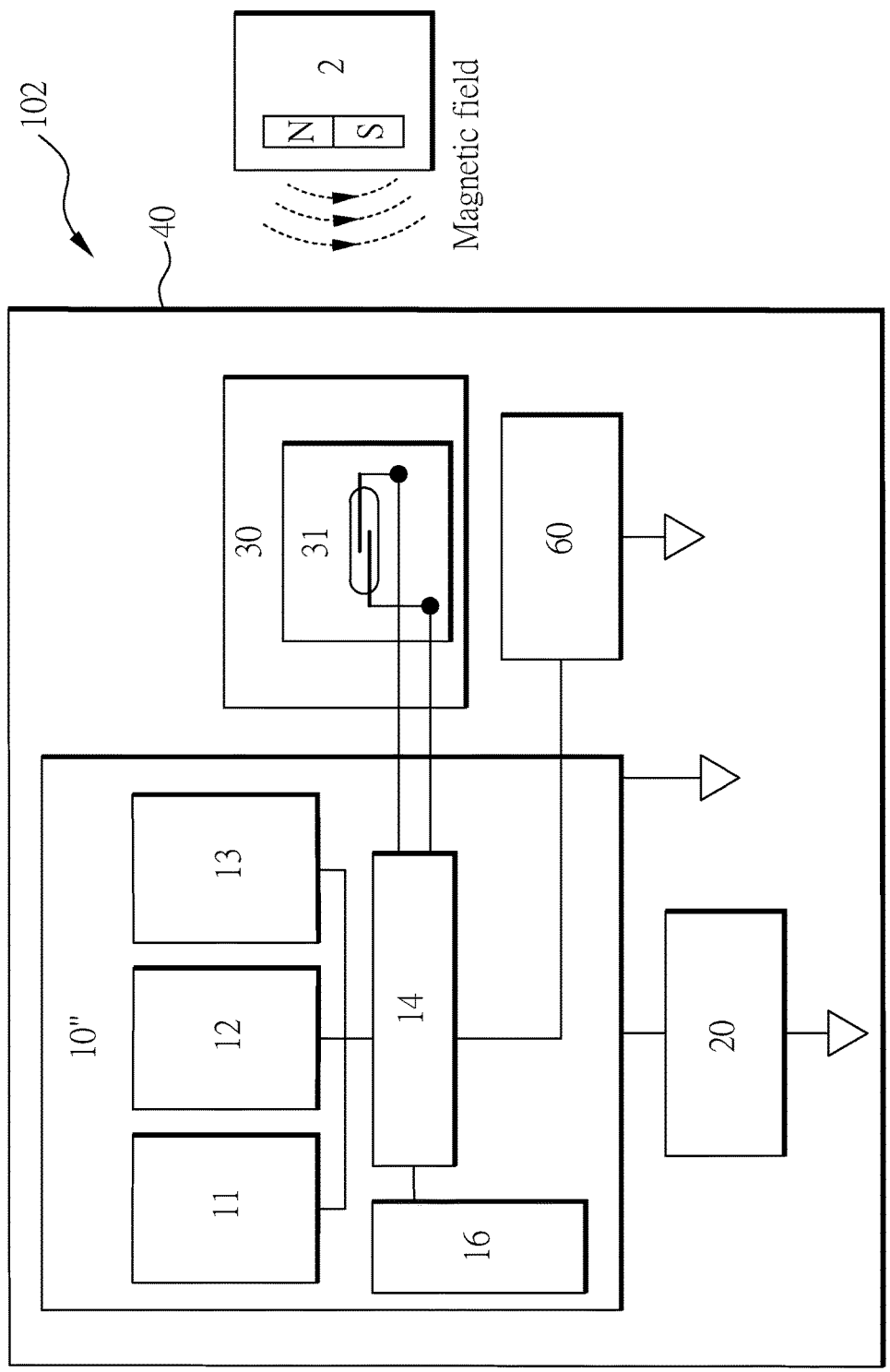
FIG. 13 shows a block diagram of the magnetically controlled tire pressure monitoring apparatus according to a fifth embodiment of the present invention.

FIG. 13 shows a block diagram of the magnetically controlled tire pressure monitoring apparatus 102 according to the fifth embodiment of the present invention.

Figure 14:
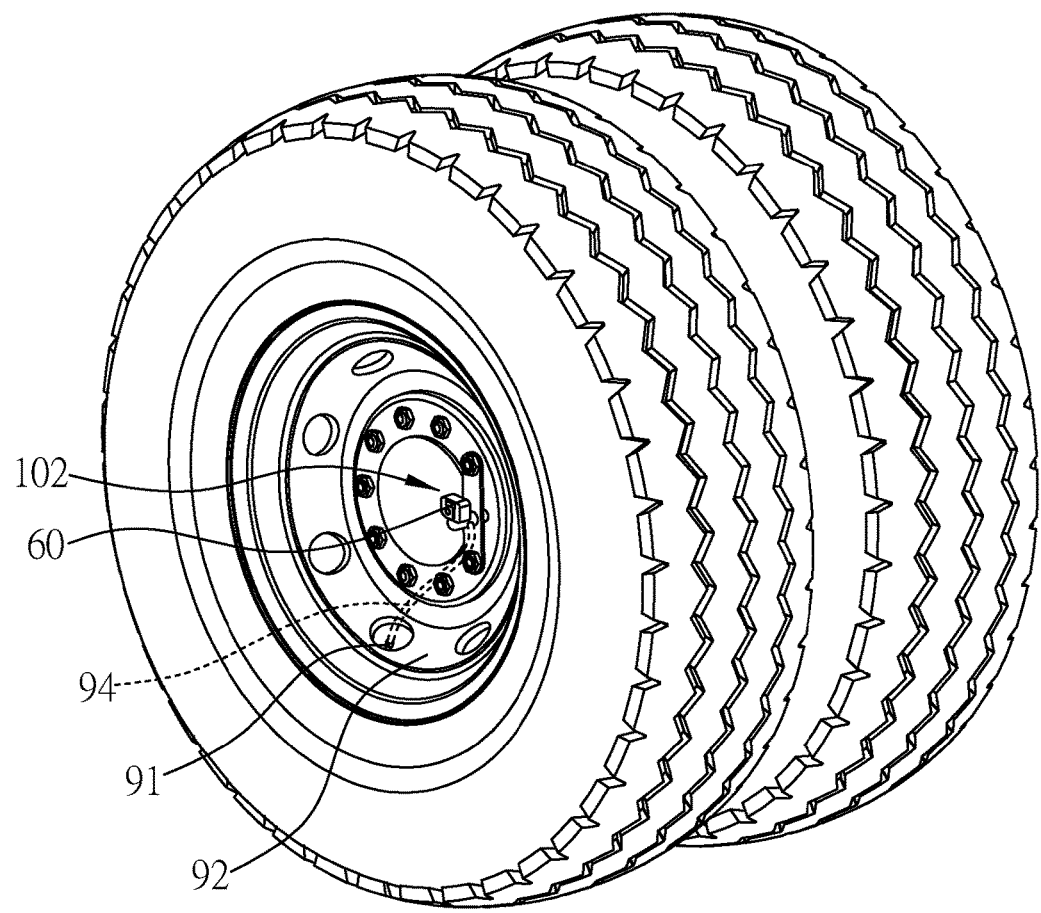
FIGS. 14 and 15 show schematic views of the magnetically controlled tire pressure monitoring apparatus installed on a wheel rim according to the fifth embodiment of the present invention.
Figure 15:
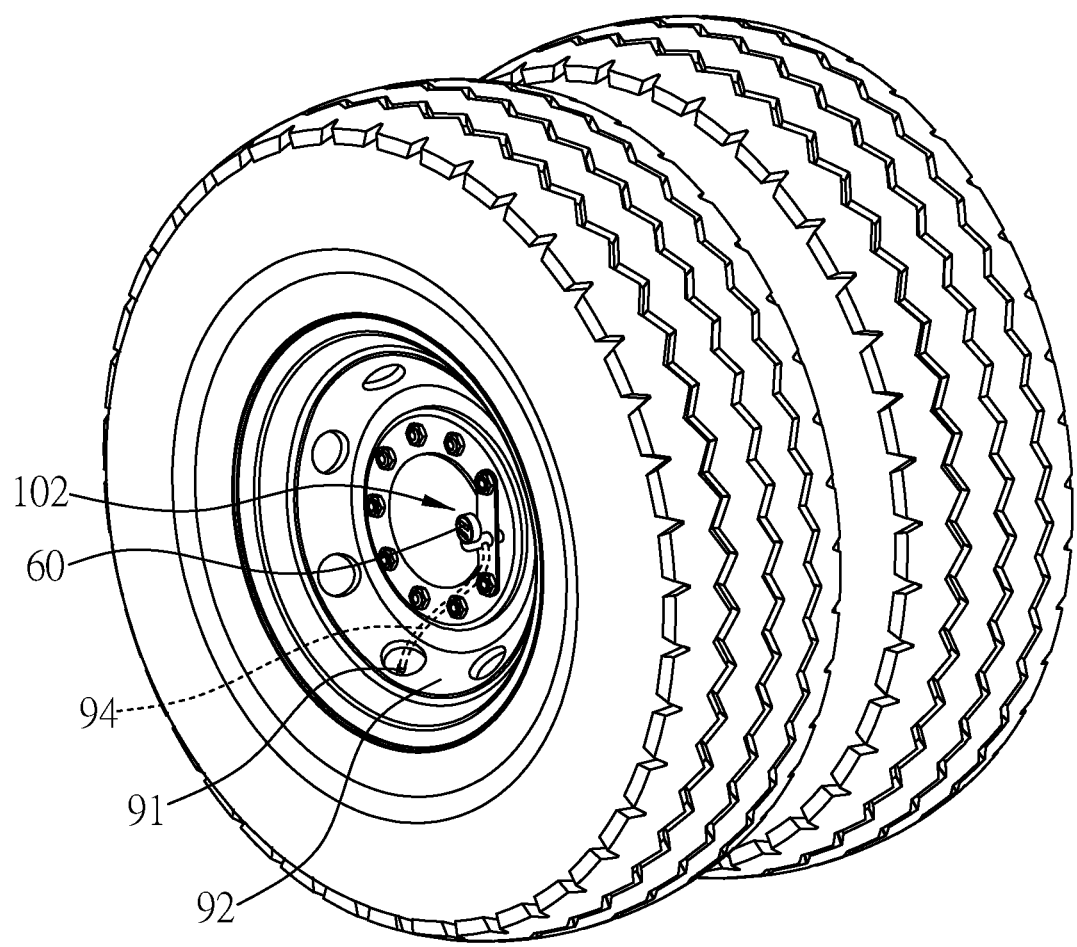

FIGS. 14 and 15 show schematic views of the magnetically controlled tire pressure monitoring apparatus 102 installed on the wheel rim 92 according to the fifth embodiment of the present invention. The magnetically controlled tire pressure monitoring apparatus 102 is connected to a valve 91 through an extension tube 94.

The magnetically controlled tire pressure monitoring apparatus 102 mainly includes a tire pressure detector 10", a power supply 20 and a wake-up device 30, which are all formed on a printed circuit board 40. In addition, the magnetically controlled tire pressure monitoring apparatus 102 further includes a display device 60.

The tire pressure detector 10" at least includes a pressure sensor 11 and a microcontroller 14. Moreover, it can include a temperature sensor 12 and a voltage sensor 13. Furthermore, it can include a register 16. The aforementioned components can be integrated into a microprocessor. It is noted that, the tire pressure detector 10" in this embodiment does not include a wireless signal transmitter 15.

The display device 60 is connected to the microcontroller 14 of the tire pressure detector 10", and shows a tire pressure value, a tire temperature value, the voltage value or an ID code. The display device 60 can be an LED display or a liquid crystal display. The display device 60 shown in FIG. 14 has a square shape, while the display device 60 shown in FIG. 15 has a circular shape.

The reed switch 31 of the wake-up device 30 is connected to the microcontroller 14, such that the microcontroller 14 determines whether to light up the display device 60 according to the on/off state of the reed switch 31, and the on/off state of the reed switch 31 depends on whether the external magnetic field exists or not.

The functions of the other components with the same numeral symbols as the first embodiment can be referred to those described in the first embodiment.

Therefore, the magnetically controlled tire pressure monitoring apparatus 102 of the present invention is lighted up only when a magnetic field approaches it, and remains dark at other times, thereby realizing the purpose of power saving.

Although the present invention has been explained in relation to the aforementioned embodiments, it is to be understood that many other possible modifications and variations can be made without departing from the spirit and scope of the invention as hereinafter claimed.

What is claimed is:

1. A magnetically controlled tire pressure monitoring apparatus, comprising:
    a tire pressure detector, including:
        a pressure sensor used to detect a tire pressure;
        a microcontroller connected to the pressure sensor and used to convert the tire pressure to a tire pressure value;
        a register connected to the microcontroller and used to store the tire pressure value or an ID code of the magnetically controlled tire pressure monitoring apparatus for data processing by the microcontroller; and
        a wireless signal transmitter connected to the microcontroller and used to convert the tire pressure value or the ID code to an electromagnetic signal;
        wherein the microcontroller is communicatively connected to a display device used to display the tire pressure value;
    a power supply used to provide electrical power to the tire pressure detector; and
    a wake-up device including a reed switch connected to the microcontroller to control whether the wireless signal transmitter transmits the electromagnetic signal or not, wherein the wake-up device or the microcontroller includes a finite-state machine used to count how many times the reed switch turns on/off or count a time interval when the reed switch is closed to determine whether a next state is a waking state or a sleep state.

2. The magnetically controlled tire pressure monitoring apparatus as claimed in claim 1, wherein the reed switch is controlled by a magnetic field emitted from a magnetic controller which is not a part of the magnetically controlled tire pressure monitoring apparatus, and the magnetic controller is a portable device or a non-portable device.

3. The magnetically controlled tire pressure monitoring apparatus as claimed in claim 2, wherein the magnetic controller includes a permanent magnet.

4. The magnetically controlled tire pressure monitoring apparatus as claimed in claim 1, wherein the tire pressure detector further includes a temperature sensor used to detect a tire temperature; the microcontroller is connected to the temperature sensor and converts the tire temperature to a tire temperature value, and the wireless signal transmitter converts the tire temperature value to the electromagnetic signal.

5. The magnetically controlled tire pressure monitoring apparatus as claimed in claim 4, wherein the tire pressure detector further includes a voltage sensor used to detect a voltage of the power supply; the microcontroller is connected to the voltage sensor and converts the voltage to a voltage value; and the wireless signal transmitter converts the voltage value to the electromagnetic signal.

6. The magnetically controlled tire pressure monitoring apparatus as claimed in claim 5, wherein the register further stores the tire temperature value or the voltage value.

7. The magnetically controlled tire pressure monitoring apparatus as claimed in claim 5, wherein the pressure sensor, the temperature sensor, the voltage sensor, the microcontroller, the wireless signal transmitter and the register is integrated into a microprocessor.

8. The magnetically controlled tire pressure monitoring apparatus as claimed in claim 5, wherein the pressure sensor, the temperature sensor, the voltage sensor, the microcontroller, the wireless signal transmitter and the register are all formed on a circuit board.

9. The magnetically controlled tire pressure monitoring apparatus as claimed in claim 1, wherein the tire pressure detector and the wake-up device are in a series connection or a parallel connection with the power supply.

10. The magnetically controlled tire pressure monitoring apparatus as claimed in claim 1, wherein the reed switch is a dry reed tube, or a magnetically controlled component having two magnetically controllable ends to perform an open circuit or a closed circuit.

11. The magnetically controlled tire pressure monitoring apparatus as claimed in claim 1, wherein the wake-up device has a learning function which analyses the time points when the magnetically controlled tire pressure monitoring apparatus turns on, and activates the magnetically controlled tire pressure monitoring apparatus automatically according to analysis results.

12. The magnetically controlled tire pressure monitoring apparatus as claimed in claim 1, wherein the wake-up device has an inspection function which checks the function of the magnetically controlled tire pressure monitoring apparatus to determine whether there is a malfunction or not.

13. The magnetically controlled tire pressure monitoring apparatus as claimed in claim 1, wherein the reed switch is a normally-open reed switch or a normally-closed reed switch.

14. A magnetically controlled tire pressure monitoring apparatus module, comprising:

a plurality of the magnetically controlled tire pressure monitoring apparatuses, each comprising:
  a tire pressure detector, including:
    a pressure sensor used to detect a tire pressure;
    a microcontroller connected to the pressure sensor and used to convert the tire pressure to a tire pressure value;
    a register connected to the microcontroller and used to store the tire pressure value or an ID code of the magnetically controlled tire pressure monitoring apparatus for data processing by the microcontroller; and
    a wireless signal transmitter connected to the microcontroller and used to convert the tire pressure value or the ID code to an electromagnetic signal;
    wherein the microcontroller is communicatively connected to a display device used to display the tire pressure value;
  a power supply used to provide electrical power to the tire pressure detector; and
  a wake-up device including a reed switch connected to the microcontroller to control whether the wireless signal transmitter transmits the electromagnetic signal or not;
a magnetic controller used to emit a magnetic field to activate the magnetically controlled tire pressure monitoring apparatuses; and
a wireless signal receiver used to receive a plurality of electromagnetic signals transmitted from the magnetically controlled tire pressure monitoring apparatuses,
wherein the wake-up device or the microcontroller includes a finite-state machine used to count how many times the reed switch turns on/off or count a time interval when the reed switch is closed to determine whether a next state is a waking state or a sleep state.

15. The magnetically controlled tire pressure monitoring apparatus module as claimed in claim 14, wherein the magnetic controller and the wireless signal receiver are arranged in a test station suitable for a car to stop at.

16. The magnetically controlled tire pressure monitoring apparatus module as claimed in claim 15, wherein the test station includes a monitoring center to monitor driving safety of a fleet of vehicles by an Internet of Vehicle system.

17. A magnetically controlled tire pressure monitoring apparatus, comprising:
  a tire pressure detector, including:
    a pressure sensor used to detect a tire pressure; and
    a microcontroller connected to the pressure sensor and used to convert the tire pressure to a tire pressure value;
  a power supply used to provide electrical power to the tire pressure detector;
  a monitor connected to the microcontroller of the tire pressure detector, and
  a wake-up device including a reed switch connected to the microcontroller to control whether to light up the monitor or not,
  wherein the wake-up device or the microcontroller includes a finite-state machine used to count how many times the reed switch turns on/off or count a time interval when the reed switch is closed to determine whether a next state is a waking state or a sleep state; and
  wherein the monitor is a display device used to display the tire pressure value.

* * * * *